United States Patent [19]

Emori et al.

[11] Patent Number: 4,709,591
[45] Date of Patent: Dec. 1, 1987

[54] RACK AND PINION STEERING APPARATUS

[75] Inventors: Yasuyoshi Emori, Meiwa; Ikuo Nomura, Higashimatsuyama, both of Japan

[73] Assignee: Jidosha Kiki Co., Ltd., Tokyo, Japan

[21] Appl. No.: 861,743

[22] Filed: May 7, 1986

Related U.S. Application Data

[63] Continuation of Ser. No. 635,399, Jul. 30, 1984, abandoned.

[30] Foreign Application Priority Data

Aug. 12, 1983 [JP] Japan ................. 58-147388

[51] Int. Cl.$^4$ ............... F16H 19/04; B62D 3/12
[52] U.S. Cl. ........................... 74/422; 74/498; 74/526
[58] Field of Search ............ 16/86 A; 52/716, 823; 74/422, 498, 526; 192/149; 180/248

[56] References Cited

U.S. PATENT DOCUMENTS

| | | | |
|---|---|---|---|
| 1,908,839 | 5/1933 | Greig | 16/86 A |
| 1,935,718 | 11/1933 | Johnson | 248/345.1 |
| 1,936,113 | 11/1933 | Jelliffe | 248/345.1 |
| 2,497,611 | 2/1950 | Jerousek | 16/86 A |
| 2,564,386 | 8/1951 | Webb | 52/716 |
| 2,596,780 | 5/1952 | Meyers et al. | 16/86 A |
| 2,760,224 | 8/1956 | Hennelly | 16/86 A |
| 3,451,709 | 6/1969 | Swauger | 248/345.1 |
| 3,505,898 | 4/1970 | Bradshaw | 74/498 |
| 3,841,044 | 10/1974 | Brown et al. | 248/345.1 |
| 3,842,565 | 10/1974 | Brown et al. | 248/345.1 |
| 3,926,070 | 12/1975 | Busso | 74/498 |
| 4,187,736 | 2/1980 | Haegele | 74/498 |
| 4,200,261 | 4/1980 | Bartlett | 248/345.1 |
| 4,262,871 | 4/1981 | Kolk et al. | 248/345.1 |
| 4,428,450 | 1/1984 | Stenstrom et al. | 74/498 |
| 4,456,315 | 6/1984 | Markley et al. | 248/345.1 |
| 4,479,400 | 10/1984 | Rieger | 74/498 |

FOREIGN PATENT DOCUMENTS

| | | |
|---|---|---|
| 54-181424 | 6/1978 | Japan . |
| 55-6168 | 1/1980 | Japan . |
| 56-62281 | 5/1981 | Japan . |

*Primary Examiner*—Rodney H. Bonck
*Assistant Examiner*—David A. Testardi
*Attorney, Agent, or Firm*—Flynn, Thiel, Boutell & Tanis

[57] ABSTRACT

A rack-and-pinion steering apparatus of center-takeoff type is disclosed in which track rods are connected to an intermediate portion of a rack shaft. A stop member is secured to the rack shaft for limiting the axial movement of the rack shaft by abutment against a housing. A resilient member is mounted on a part of these contacting surfaces so that the resilient member initially contacts either component to absorb impact before a contact occurs between metals, thus assuring the stroke limiting function while reducing the generation of percussion sounds.

5 Claims, 17 Drawing Figures

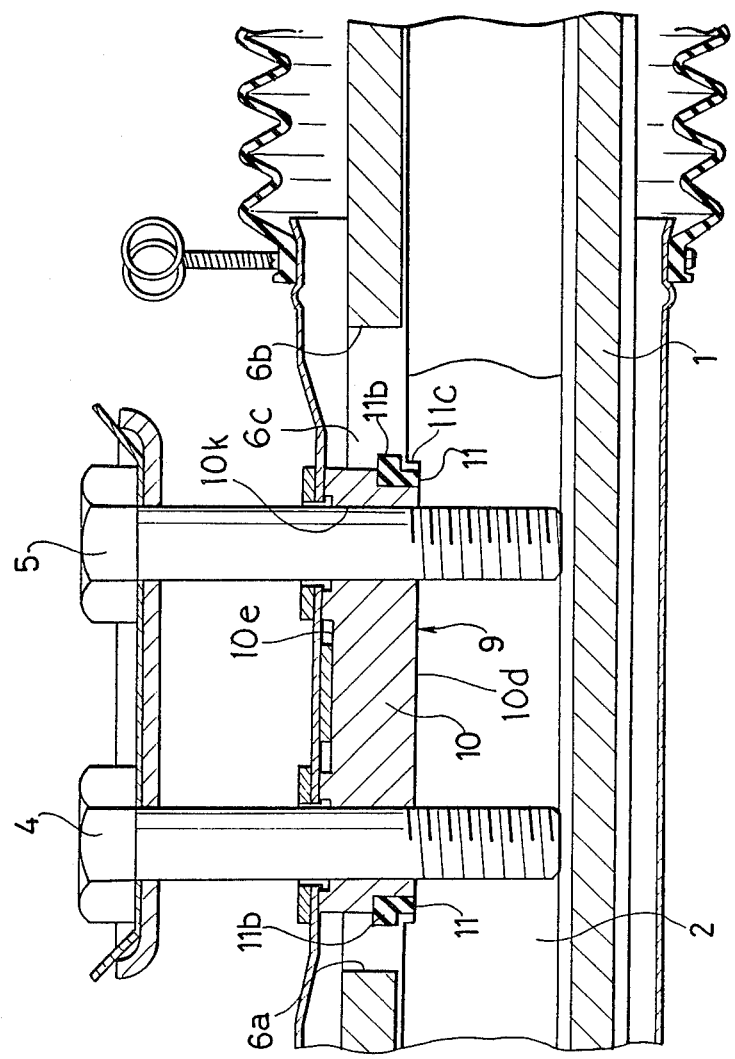

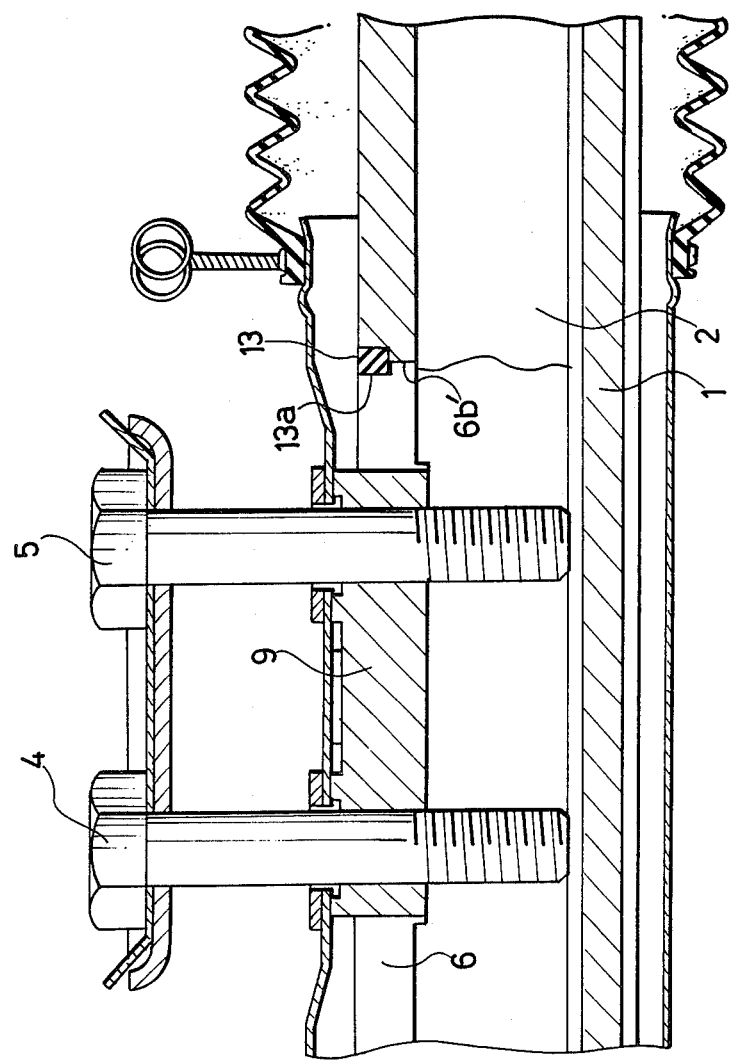

RACK AND PINION STEERING APPARATUS

This application is a continuation, of U.S. Ser. No. 635 399, filed July 30, 1984, now abandoned.

BACKGROUND OF THE INVENTION

The invention relates to a rack-and-pinion steering apparatus, and more particularly, to such apparatus of center-takeoff type in which track rods which transmit a steering force to steerable road wheels are connected to a rack shaft intermediate its length.

In general, in a rack-and-pinion steering apparatus of center-takeoff type, track rods which transmit a reciprocating motion of the rack shaft to turn the steerable road wheels are connected to an intermediate portion of the rack shaft by means of bolts through an elongate slot which is formed in a rack housing, rather than being connected to opposite end faces of the rack shaft. In order to limit the axial movement of the rack shaft, the pair of bolts which are used to connect the track rods are used to secure a stop member to the rack shaft, with the end face of the stop members being arranged for interference with the end face of the elongate slot formed in the rack housing to stop the rack shaft.

In conventional steering apparatuses of the type described, the rack housing is formed of a metal material while either metal or resin material is used to construct the stop member. When the stop member is formed of a metal, it has sufficient strength to provide a satisfactory reliability in its function to limit the stroke, but suffers from the generation of disagreeable sounds of percussions between metals. The use of resin stop effectively reduces such percussion sounds, but suffers from the inability to obtain sufficient reliability in limiting the stroke.

SUMMARY OF THE INVENTION

It is an object of the invention to provide a rack-and-pinion steering apparatus which satisfies the requirement for stroke limitation while avoiding the generation of percussion sounds during the full stroke.

Such object is achieved by forming a stop member of a metal material, and embedding a resilient member partially into one of contacting surfaces of the stop member and the end face of an elongate slot formed in a housing so that a contact between metals occurs after an initial contact of the resilient member with either surface.

Other objects and features of the invention will become apparent from the following description given in connection with the attached drawings.

BRIEF DESCRIPTION OF THE DRAWINGS

FIG. 2 is an enlarged view of part of the arrangement shown in FIG. 1;

FIG. 9 is a fragmentary enlarged longitudinal section of another embodiment of the invention;

DETAILED DESCRIPTION OF EMBODIMENTS

Figure 1:
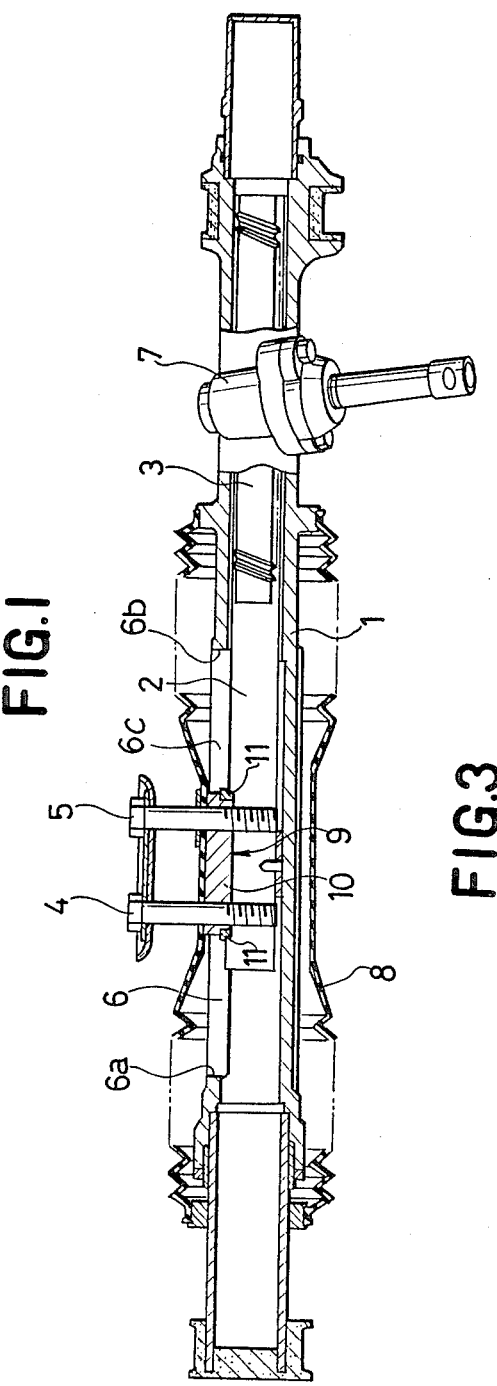
FIG. 1 is a longitudinal section of a rack-and-pinion steering apparatus according to one embodiment of the invention.

Referring to FIG. 1, there is shown a rack-and-pinion steering apparatus of center-takeoff type including a rack housing 1. A rack shaft 2 is slidably received within the rack housing 1, and is formed with rack teeth 3 along its one end portion while the other end of the rack shaft is threadably engaged by a pair of bolts 4, 5 which project through an elongate slot 6 formed in the rack housing. The bolts 4, 5, are connected to track rods (not shown), respectively, which extend axially of the rack shaft 2. The other end of these rods are connected to a pair of steerable road wheels which may be turned to the left or to the right in response to the reciprocating movement of the rack shaft 2. The rack teeth 3 are disposed in meshing engagement with a pinion 7 which can be rotated by a steering wheel, not shown. In this manner, a turning movement of the steering wheel can be transmitted through the pinion 7 and the rack shaft 2 to produce a displacement of steerable road wheels in either right or left direction.

It is to be understood that the elongate slot 6 formed in the rack housing has a length which permits a movement of the rack shaft 2 in its axial direction. In such region, the periphery of the rack housing 1 is covered by a boat 8 of a flexible material in order to prevent ingress of foreign materials into the housing. A stop member 9 is secured to the rack shaft 2 by means of the pair of bolts 4, 5, and the extent of movement of the rack shaft 2 to the left or right is limited by the interference of the stop member 9 with either axial end face 6a, 6b of the elongate slot 6.

Figure 3:
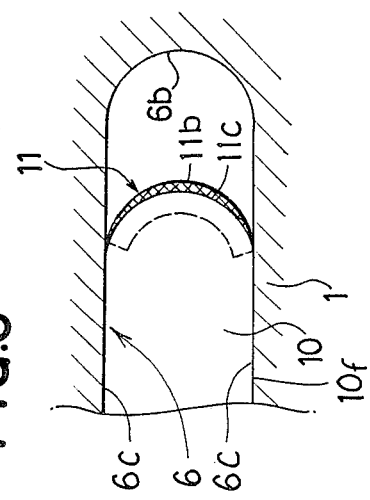
FIG. 3 is a schematic view illustrating an elongate slot formed in a housing and a stop member disposed therein.
Figure 4:
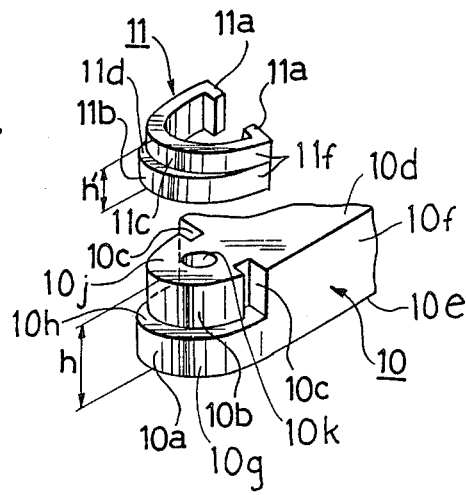
FIG. 4 is a perspective view of a stop member, as viewed from the bottom thereof.

FIGS. 2 to 4 illustrate the construction of the stop member in detail. The stop member 9 comprises a body 10 of a metal material, which carries resilient members 11 as may be formed of a resin or the like which are attached to the lower portion of opposite axial end faces. As shown in FIGS. 3 and 4, each resilient member 11 is semi-circular in configuration and has a height h' which is substantially equal to one-half the height h of the metal body 10. At its opposite ends, the resilient member is formed with a pair of inwardly directed tabs 11a. Along its arcuate periphery, the outboard (upper in FIG. 2) portion of the resilient member is formed with a bulge 11b.

Each end of the metal body 10 has a semi-circular periphery 10a, the inboard (lower in FIG. 2) one-half of which is formed as a recessed portion 10b of a reduced diameter which is subtantially equal to the inner diameter of the resilient member 11. The portion 10b is notched at its opposite sides, as shown at 10c, to permit the tabs 11a of the resilient member to be engaged therewith, thus preventing the resilient member 11 from being disengaged from the body 10.

More particularly as to the body 10, the height h of the body 10 is measured in a direction therethrough from inside the housing 1 outwardly of such housing 1

(compare FIGS. 1 and 2 with FIG. 4). The body 10 has opposed inboard and outboard faces 10d (FIG. 4) and 10e respectively facing into and outwardly of the housing 1 (FIGS. 2 and 4) and has side faces 10f (FIGS. 3 and 4). Each end of the body 10 has its semicircular peripheral surface 10a formed by coaxial inboard and outboard cylindrical, semicircular end faces, respectively indicated at 10b and 10g. The inboard end face 10b, being of lesser diameter than the outboard end face 10g, therewith forms a step 10h having a semicircular portion facing inboard of the housing 1. The inboard portion 10b and step 10g thus define a semicircular recess 10b, 10h in the end of the body 10. As seen in FIG. 4, the step 10h lies in a plane intermediate the planes defined by the inboard and outboard faces 10d and 10e of the body. The semicircular portion of the step 10h is of substantially constant radial width, as seen in FIG. 4.

The semicircular recess 10b, 10h defined by the semicircular step 10h and semicircular inboard end face 10b of the body 10 extends through a half circle (as seen in FIG. 4) from one side face 10f to theother side face 10f of the body 10. The notches 10c extend substantially diametrally into the body 10 from the circumferential ends of such semicircular recess 10b, 10h of the body 10, to undercut the portion of the body 10 separating the notches 10c from the semicircular inboard end fce 10b. The notches 10c (FIG. 4) are sharply angled to the adjoining ends of the semicircular recess portion 10b, 10h. The notches 10c and semicircular recess portion 10b, 10h together make the recess substantially D-shaped, except that the adjacent ends of the notches 10c are spaced apart from each other (see FIG. 4). The circumferential ends of the semicircular recess portion 10b, 10h and the notches 10c open sidewardly toward the opposed sides 6c (FIG. 2) of the housing slot 6.

As to the resilient member 11, same is of corresponding substantial D-shape (as seen in FIG. 4), comprising a semicircular band 11c, 11b of half circle extent and of inside diameter corresponding to the outside diameter of the seicircular recess 10b, 10h. The substantially D-shaped resilient member 11 has its tabs 11a of substantially rectilinear shape and extending toward each other from the circumferential ends of the semicircular band 11b, 11c and sharply angled with respect thereto. The tabs 11a rise the full height of the notches 10c from the plane of the step 10h to the plane of the inboard face 10d of the metal body 10 (see FIG. 4). The step 11d of the resilient member 11 has a width diminishing circumferentially toward the tabs 11a (as seen in FIG. 4), such that the bulge 11b merges into coplanar relation with the recessed inboard portion 11c at the opposite sides 11f of the D-shaped resilient member 11 adjacent its tabs 11a. The sides 11f and conjoined tabs 11a are of substantially constant thickness throughout their height (vertically in FIG. 4). The sides 11f of the resilient member 11, at the tabs 11a, are flush with the sides of the body 10, as can be seen in FIG. 4 from the similar sideways thickness of the resilient member sides 11f and step 10h and from the similar sideways widths of the resilient member 11 and body 10. The sides 6c of the housing slot 6 lie close along the sides 11f of the resilient member 11 at the tabs 11a (see for example FIG. 3) and therewith positively block removal of the tabs 11a from the notches 10c in the body 10. The bulge 11b at the central outboard portion of the resilient member 11 projects endwise beyond the central inboard portion 11c of such resilient member and thus defines an inboard facing step 11d.

The body 10 has a hole 10k therethrough adjacent the end 10a, 10b thereof and running between the inboard and outboard faces 10d and 10e thereof (FIGS. 2 and 4). A screw 5 extends through such hole 10k to the rack shaft 2 (FIG. 2). The D-shaped resilient member 11 extends from the end 10b of the body 10 lengthwise of the latter past the screw 5 and hole 10k, toward the notches 10c which penetrate into the sides 10e of the body 10 behind the hole 10k.

With the described construction, when the steering wheel is turned through an increased angle to cause the rack shaft 2 to be driven axially through the pinion 7 until the stop member 9 interferes with either end face 6a or 6b of the elongate slot to limit the stroke, only the bulge 11b of the resilient member 11 will come into contact with either end face 6a or 6b without producing percussion sounds for a low load. For medium to high loads, the bulge 11b of the resilient member initially contacts with either end face 6a or 6b, followed by a gradual compression of the bulge 11b to absorb the kinetic energy to reduce the speed of impact between the stop member 9 and the housing 1, to a level where no percussion sound can be produced, and finally the upper peripheral portion 10a of the metal body 10 interferes with either end face 6a or 6b of the elongate slot to accomplish its stroke limiting function. In this manner, a high reliability in limiting the stroke is achieved simultaneously with preventing the generation of percussion sounds.

Figure 5A:
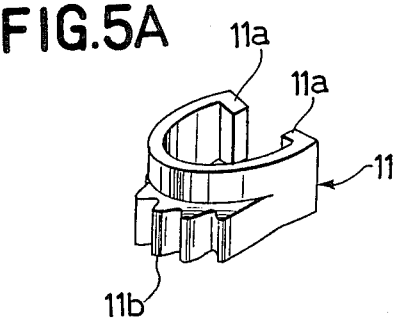
FIGS. 5 to 8 illustrate other forms of a resilient member, with FIGS. 5(A) to 8(A) being perspective views, FIGS. 5(B) to 8(B) being plan views and FIG. 8(C) being a cross section as taken through line C—C shown in FIG. 8(B)
Figure 5B:
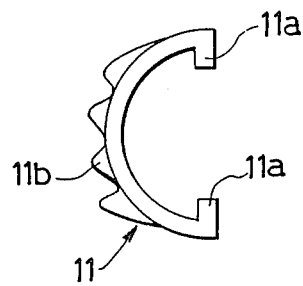
Figure 6A:
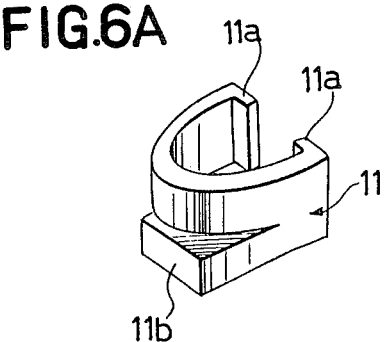
Figure 6B:
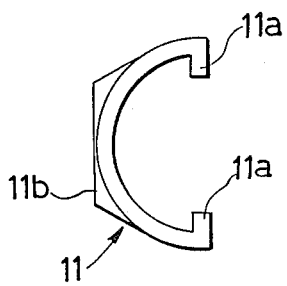
Figure 7A:
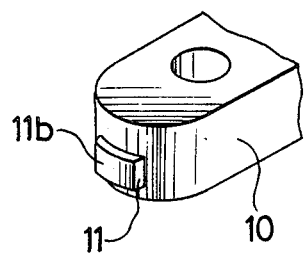
Figure 7B:
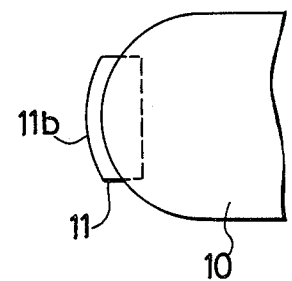
Figure 8A:
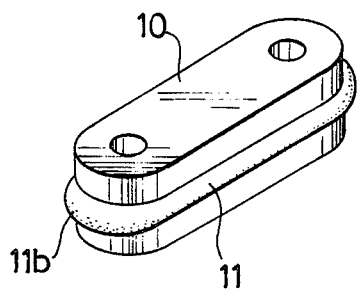
Figures 8B, 8C:
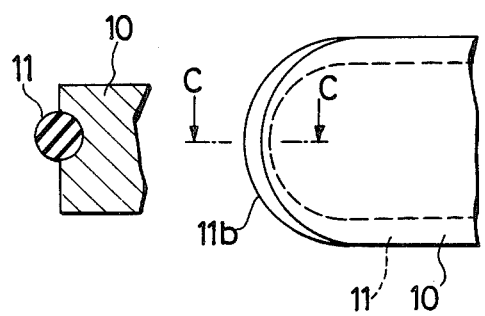

FIGS. 5 to 8 illustrate other forms of the resilient member 11 which may be mounted on the metal body 10 of the stop member 9. In FIG. 5, the bulge 11b of the resilient member 11 is corrugated while the bulge 11b is formed as a flat surface in FIG. 6. In FIGS. 7(A) and (B), a resilient member 11 is substantially rectangular configuration is embedded into an adjacent end of the body 10 with its part exposed externally. In FIG. 8, a resilient member 11 is in the form of an O-ring which is fitted around the body 10 so that its outer side is externally exposed. It should be understood however that the configuration of the resilient member 11 is not limited to the specific examples given above, but that any resilient member may be used which is embedded into the body 10 to be partly exposed from the opposite longitudinal ends thereof so that at the end of the stroke, the resilient member 11 initially comes into contact with the housing 1, followed by compression thereof to allow the metal body 10 to be brought into contact with the housing 1.

Figure 10:
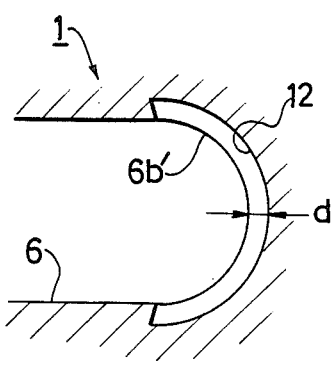
FIG. 10 is a plan view of an elongate slot formed in a housing which is used in the embodiment shown in FIG. 9.
Figure 11:
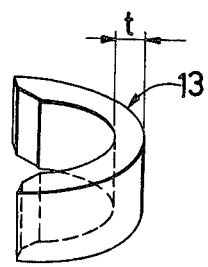
FIG. 11 is a perspective view of a resilient member used in the arrangement of FIGS. 9 and 10.

FIGS. 9 to 11 show another embodiment of the invention in which a resilient member is disposed on the housing 1. As shown in FIG. 10, each of the end faces 6a, 6b of an elongate slot 6 formed in the housing is formed with a substantially semi-circular recess 12 in its upper half in which is mounted a resilient member 13. The resilient member 13 is semi-circular in configuration and has a thickness t which is greater than the depth d of the recess 12 (see FIG. 11) so that when it is mounted in the recess 12, it projects inwardly beyond the lower portions 6a', 6b' of the end faces 6a, 6b. Accordingly, when the stop member 9 moves into contact with either end face 6a, 6b at the end of stroke of the rack shaft 2, the projecting portion 13a of the resilient member 13 initially abuts against the stop member 9, and subsequently the metal surface of the lower portion 6a', or 6b' of the end face 6a or 6b comes into contact with the stop member 9, thus positively limiting the stroke. As in the first mentioned embodiment, the reliability of the basic function to limit the stroke is assured while simultaneously alleviating the generation of percussion sounds.

Figure 12:
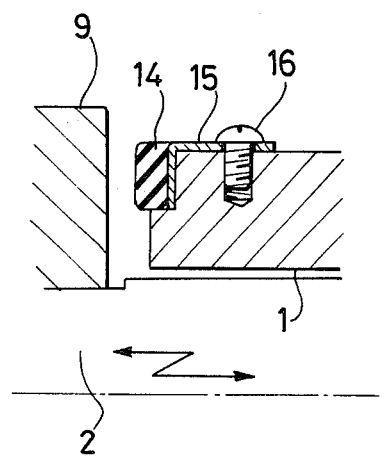
FIG. 12 is a cross section showing another form of resilient member.

FIG. 12 shows another form of resilient member 14 which is mounted on the housing 1.

The resilient member 14 is secured to an L-shaped metal piece 15 as by brazing, and the metal piece 15 is connected to the housing 1 by a set screw 16. The resilient member 14 of this example serves the same purpose as mentioned above, and its detachment from the housing 1 can be positively prevented.

While the invention has been shown and described above in connection with the specific embodiments thereof, it should be understood that a number of changes, modifications and substitutions will readily occur to one skilled in the art without departing from the scope and spirit of the invention as defined by the appended claims.

What is claimed is:

1. A rack-and-pinion steering apparatus, comprising:
a rack shaft received within a rack housing and axially reciprocable therein;
a pinion disposed in meshing engagement with the rack shaft and adapted to be rotated to cause axial movement of the rack shaft in response to an operation of a steering wheel;
a stop member engaged with the rack shaft and having a portion projecting outwardly through an axially elongate shaft formed in the housing and means connected to the projecting portion of the stop member for turning steerable road wheels, said stop member having a metal body disposed for end interference with opposed end faces of the elongate slot formed in the housing to limit the movement of the rack shaft in either direction as the rack shaft moves, the height of said body being measured in a direction therethrough from inside said housing outwardly of said housing, said body having opposed inboard and outboard faces respectively facing into and outwardly of said housing, said body having side faces facing sides of said slot and extending lengthwise of said slot, said body having an end in turn having a semicircular stepped cylindrical peripheral surface formed by coaxial inboard and outboard cylindrical, semicircular end faces, the inboard end face being of lesser diameter than the outboard end face and thereby forming a step having a semicircular portion facing inboard of said housing, said step lying in a plane intermediate planes defined by said inboard and outboard faces of said body, said semicircular step portion being of substantially constant radial width, said step and the inboard portion of said end defining a semicircular recess;
a resilient member which is capable of absorbing impacts produced as an inteference occurs between said end of the stop member metal body and one opposed end face of the slot, said resilient member being received in said semicircular recess in said body and having a generally L-shaped central cross-section as seen looking sideways of said body and hence widthwise of said slot and such that a central part of an outboard portion of said resilient member forms a bulge that projects endwise beyond a central part of a recessed inboard portion of said resilient member and thus defines an inboard facing step, the bulge projecting beyond said end of the stop member toward the opposed slot end face for resiliently compressing prior to allowing contact between the end of said body and the opposed end face of said slot;
means for preventing detachment, including endwise detachment, of said resilient member from said stop member, said means comprising opposed, substantially rectilinear notches in opposite sides of said body and spaced from said end of said body, said semicircular recess defined by said semicircular step portion and semicircular inboard end face of said body extending through a half circle from one side face to the other side face of said body, said notches extending substantially diametrically into said body from the circumferential ends of said semicircular recess portion so as to undercut said semicircular inboard end face, said notches being sharply angled to the adjoining ends of said semicircular recess portion, said notches and semicircular recess portion together making said recess substantially D-shaped except that the adjacent ends of said notches are spaced apart, said notches opening sidewardly toward the opposed sides of sid housing slot, said recessed inboard portion and said bulge each being about half the height of said resilient member, said resilient member being of corresponding substantial D-shape defined by a semicircular band of substantially half-circle extent and of inside diameter corresponding to the outside diameter of said semicircular recess, said substantially D-shaped resilient member having substantially rectilinear, spaced tabs extending toward each other from the circumferential ends of said semicircular band and sharply angled with respect thereto, said tabs rising the full height of said notches from the plane of said step of said body to the plane of said inboard face of said body, said step defined by said endwise projecting bulge of said resilient member having a width diminishing circumferentially toward said tabs, such that said bulge gradually merges into coplanar relation with said inboard portion at opposide sides of said D-shaped resilient member adjacent said tabs, the engagement between the tab and the notch being effective to mount the resilient member on the body of the stop member, said notches being of depth to fully receive therein said tabs of said resilient member so the latter does not protrude beyond the body side faces, said sides of the resilient member being of substantially constant thickness throughout their height, the sides of said resilient member at said tabs being substantially flush with the side faces of said body, the sides of said housing slot lying close along the sides of said resilient member at said tabs and thereby positively blocking removal of said tabs from said notches.

2. The apparatus of claim 1 in which said metal body has a hole therethrough adjacent said end thereof and running between the inboard and outboard faces thereof, and a screw through said hole fixing said body to said rack shaft, said D-shaped resilient member extending from said end of said body lengthwise of the latter past said screw and hole toward said notches, said notches penetrating into the sides of the body behind said hole therein.

3. A rack-and-pinion steering apparatus according to claim 1 in which the resilient member bulge has an arcuate central contacting surface.

4. A rack-and-pinion steering apparatus according to claim 1 in which the resilient member bulge has a flat central contacting surface.

5. A rack-and-pinion steering apparatus according to claim 1 in which the resilient member bulge has a corrugated central contacting surface.

* * * * *